Feb. 25, 1930. R. D. VINCENT 1,748,590
METHOD OF AND APPARATUS FOR RETREADING TIRES
Filed May 21, 1927
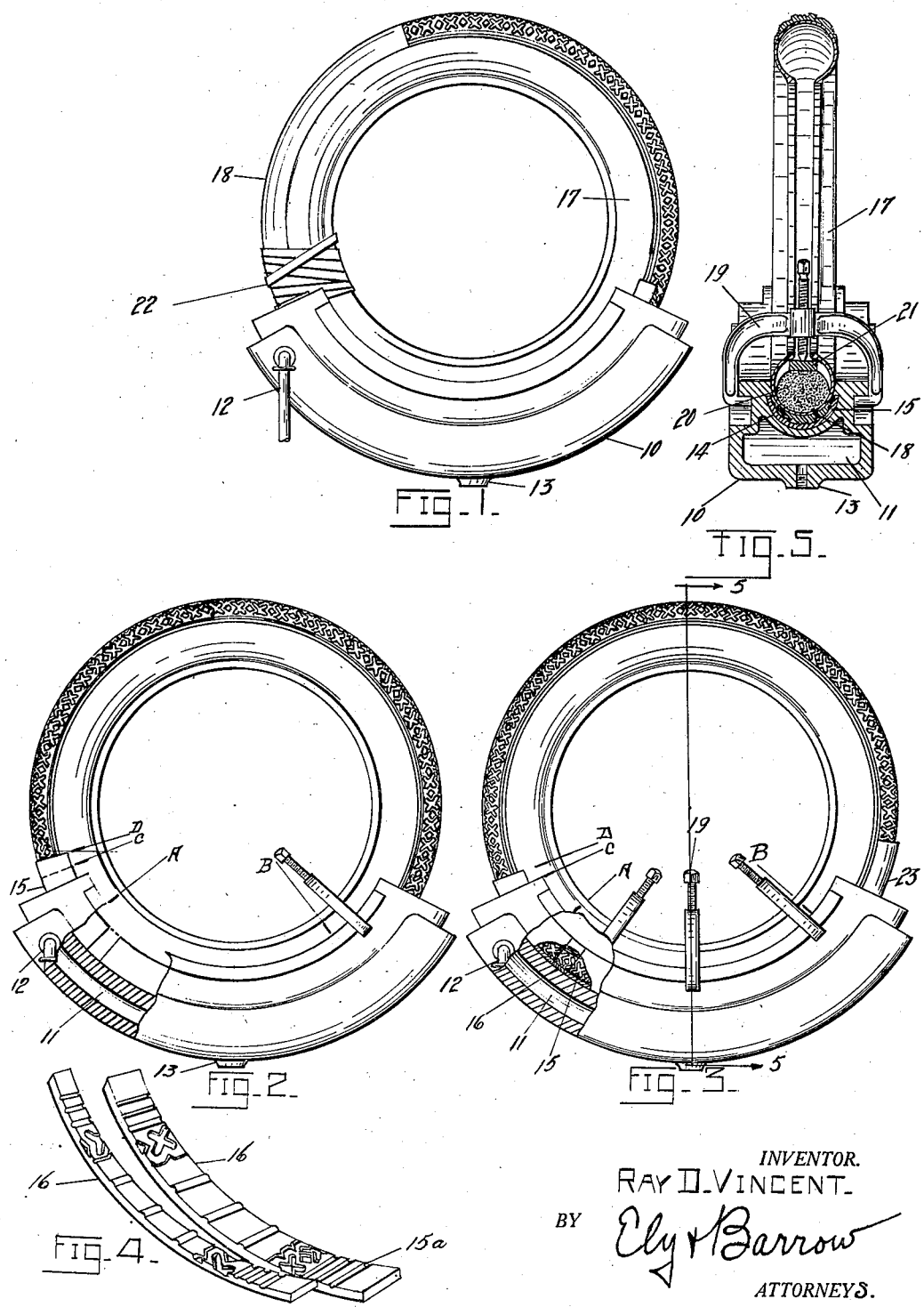
INVENTOR.
Ray D. Vincent.
BY Ely & Barrow
ATTORNEYS.

Patented Feb. 25, 1930

1,748,590

UNITED STATES PATENT OFFICE

RAY D. VINCENT, OF BARBERTON, OHIO, ASSIGNOR TO THE FIRESTONE TIRE AND RUBBER COMPANY, OF AKRON, OHIO, A CORPORATION OF OHIO

METHOD OF AND APPARATUS FOR RETREADING TIRES

Application filed May 21, 1927. Serial No. 193,197.

This invention relates to a procedure for retreading pneumatic automobile tire casings and to vulcanizer and matrix apparatus for carrying out the process.

Due to differences in expansion, tread thickness, tread tension, etc., the outer peripheral circumference of such tire casings is found to vary somewhat after the uncured tread gum is assembled thereon. Consequently, when the tread is vulcanized onto the casing on a third circle repair vulcanizer, the tread design ordinarily does not come out evenly, the tires varying from an eighth of an inch to two inches in circumference. The manner of taking care of this difficulty in the past has been to slide the end section of the sectional tire design matrix placed within the repair vulcanizer until it matches the design which was vulcanized onto the tread in the first operation, there being three vulcanizing operations to complete the entire tread. However when the end section of the matrix is spaced apart from its adjoining section, a blank raised portion of the thickness of the matrix, will be vulcanized on the tire tread. In buffing this raised portion off level with the design it frequently happens that the rubber is buffed away until the cushion gum is exposed, thus making a weak spot in the tread with no design thereon, and an unsatisfactory job.

An object of the invention is to devise a third-circle tire retreading mold or vulcanizer with slidable segmental matrices for forming the non-skid impressions of the tread design. A further object of the invention is to provide a number of narrow match-end matrix segments of varying circumferential widths, whereby when the proper width of match-end matrix is used the design formed by the final vulcanization step will match up with the impression first vulcanized onto the tread, thus preventing mashed or blank tread sections. Another object is to devise a method of retreading tire casings, preventing the overflowing and partial curing of the green gum that has heretofore occurred during the first and second cures. A further object is to devise a method of matching the tread impressions on the final cure.

The foregoing and other objects are obtained by the method and apparatus illustrated in the accompanying drawings and described below. It is to be understood that the invention is not limited to the specific form thereof disclosed herein.

Of the accompanying drawings:

Figure 1 is a front elevation of a vulcanizer embodying the principles of the invention and illustrating a tire casing in position for the second cure;

Figure 2 is a similar view, partly broken away, illustrating a step in the matching of the tread matrices;

Figure 3 is a similar view illustrating the tire casing and matrices in position for the final cure;

Figure 4 is an enlarged detail perspective view of two match-end matrix sections; and Figure 5 is a vertical transverse section taken on the line 5—5 of Figure 3.

Referring to the drawings, 10 represents a steam-jacketed third-circle vulcanizer or mold, which is segmental in elevation and U-shaped in cross-section, the steam chamber 11 therein being provided with inlet and outlet ports 12 and 13, respectively. The inner channel of the vulcanizer is recessed at 14 to accommodate a plurality of segmental tread design matrices 15, the latter being slidable in the recess and having the design patterns thereon registering with each other when the segments are in contact. A number of relatively narrow matrix segments 16 of varying widths are also provided for insertion within the vulcanizer to match up the tread design on the final cure, as will be later described. The tire casing 17 with a new tread 18 to be vulcanized thereon, is positioned within the vulcanizer and clamped against the matrices by clamps 19 pressing against a pressure bar 21 interposed between the clamps and a sand bag 20 placed in the casing to distribute the pressure.

The method of retreading tire casings with the above apparatus is as follows:

After the old tread is removed from the casing, the latter is buffed and coated with rubber cement. The proper length of assembled green gum tread stock or so-called "camel-back" is then stretched and stitched onto the carcass. The edges of the tread are next trimmed, enough of the old side wall being left so that at least one of beads 15ª of matrix segments 15 will overlap said side wall to prevent lateral overflow of rubber during the curing operation. The matrix segments are painted with soap solution to prevent adhesion of rubber thereto and are then inserted in the mold to project an inch or so above each end thereof. The sand bag and pressure bar are inserted in the tire and the latter then placed in the mold. A wrapping of muslin tape 22 is then applied about the tire at each end of the section to be cured, to prevent sponginess and end overflow of rubber, the wrapping being started about one quarter to half an inch below edge of matrix. Clamps 19 are next tightened and the cure started, after which the clamps may be retightened during the cure as desired.

The second third of the tread is cured in a similar manner. In this case three or four units of the previously molded tread design are overlapped on one end of the matrix and the tire at the other end of the matrix wrapped with muslin tape, clamped and cured as in the first cure. At this stage the tire and mold appear as illustrated in Figure 1 of the drawings.

Preparatory to the third and final cure, chalk marks A and B are made on the tire to show length of uncured tread stock, so that this portion of the tire may be correctly positioned over the live steam part of the vulcanizer on the final cure. After the tire is thus positioned, the sand bag and pressure bar are shifted around into place and three or four tread units again matched and overlapped at the end of the matrix sections. With the tread held firmly in the matrices, the tire and matrices are slid around in the mold toward the side not yet matched until one section comes completely out of the mold. This matrix is removed and a chalk mark C made on the tire opposite the outermost end of the next matrix section which should project about two inches above the mold, as indicated by the dotted line in Figure 2. One clamp is then tightened slightly over point B to hold the tire while the projecting matrix is pulled up until it matches the tread impression formed by the first cure, chalk mark D being made on the tire at the end of the matrix. A space is left between the matrix sections as shown in Figure 2 which is of the same length as the distance C—D. One of the narrow match-end matrix segments 16 most exactly spanning the distance C—D is selected, and inserted in the mold to fill the above mentioned space, the end matrix being removed to permit this insertion and then replaced. The matrices and tire are then slid back to center A—B in the mold as illustrated in Figure 3, and a filler strip 23 of rubber, cardboard or the like inserted in space between the mold and the tire at the end first matched to prevent overcuring or mashing of the cured tread. All of clamps 19 are then tightened and the final cure proceded with. Thus both ends of the matrices are matched up with the previously formed tread impressions and no blank space will appear on the final cure.

Modifications of the invention may be resorted to without departing from the spirit thereof or the scope of the appended claims.

What is claimed is:

1. Section mold apparatus for retreading tires, said apparatus comprising a segmental mold, a matrix extending throughout the length of the mold, said matrix being in sections and slidable circumferentially in the mold cavity, and a plurality of matrix segments of graduated widths to be selectively inserted intermediate the above mentioned matrix sections, whereby the matrix length will be adjustable on the final cure for matching with both ends of the tread impressions formed on previous cures.

2. The method of retreading tires, which comprises stitching an uncured tread on the tire carcass, clamping the tire against a tread design forming matrix positioned in a vulcanizing mold, overlapping the matrix onto the old side wall of the tire to prevent lateral overflow of rubber, wrapping a fabric tape about the tire at the end of the matrix to prevent end overflow of rubber, and vulcanizing the tread onto the carcass.

RAY D. VINCENT.